May 20, 1958  R. H. ECKART  2,835,385
LUMBER SORTING CONVEYOR
Filed Dec. 20, 1954  4 Sheets-Sheet 1
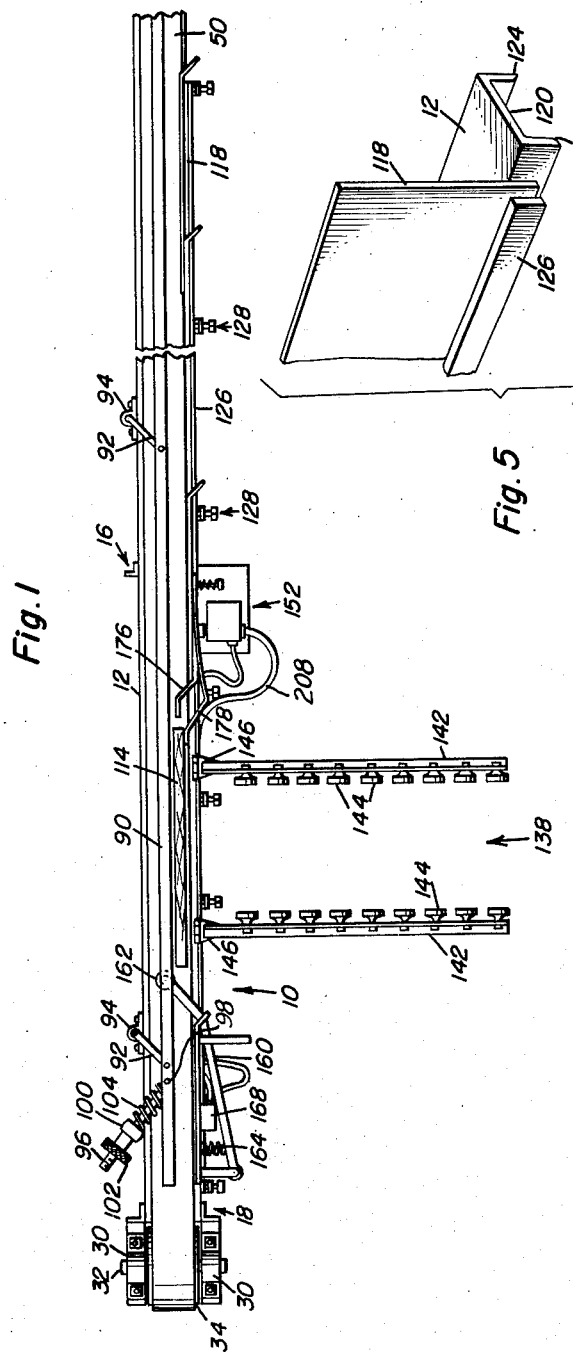
Robert H. Eckart
INVENTOR.

May 20, 1958 R. H. ECKART 2,835,385
LUMBER SORTING CONVEYOR
Filed Dec. 20, 1954 4 Sheets-Sheet 2
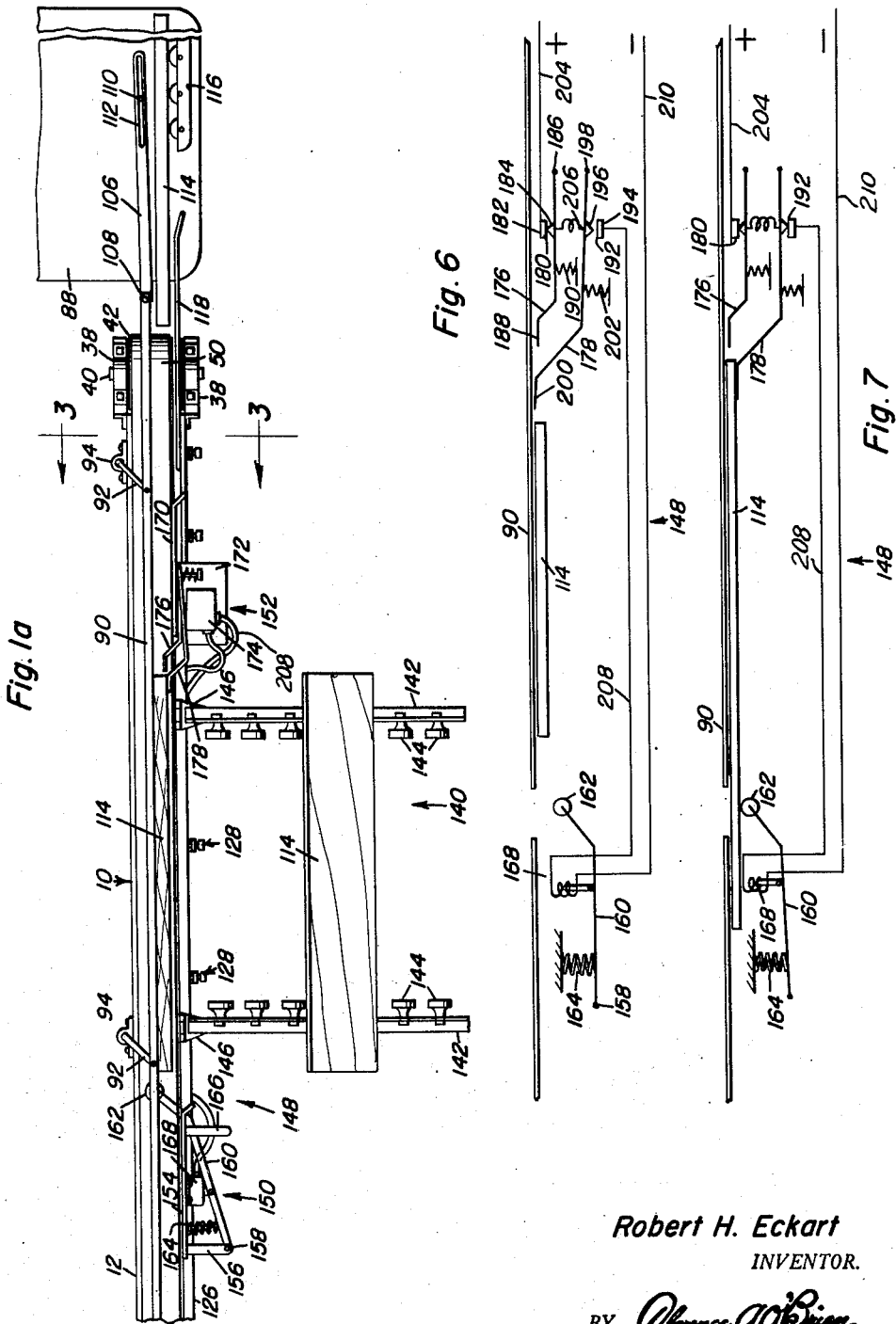
Robert H. Eckart
INVENTOR.

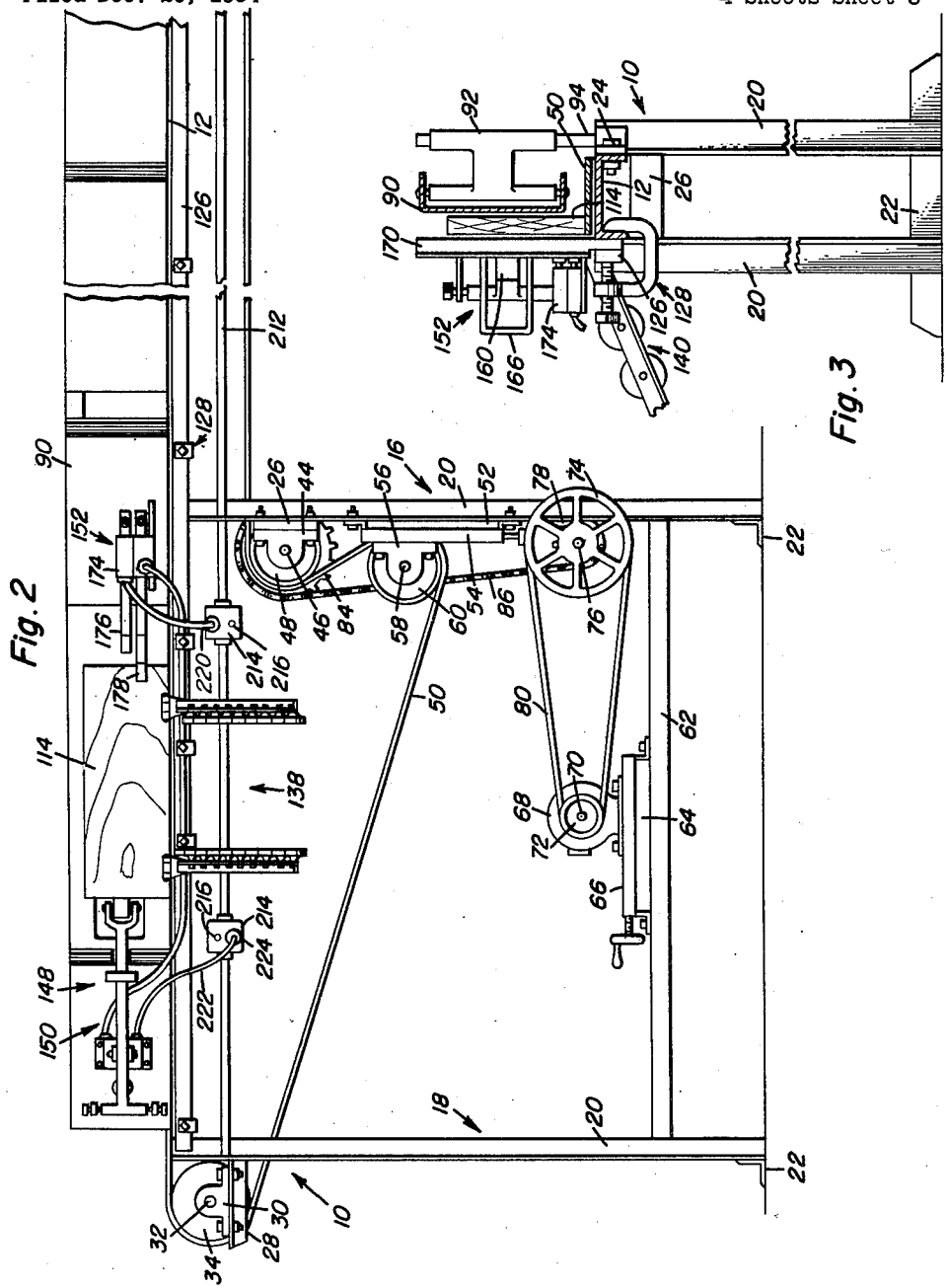

May 20, 1958  R. H. ECKART  2,835,385
LUMBER SORTING CONVEYOR
Filed Dec. 20, 1954  4 Sheets-Sheet 4
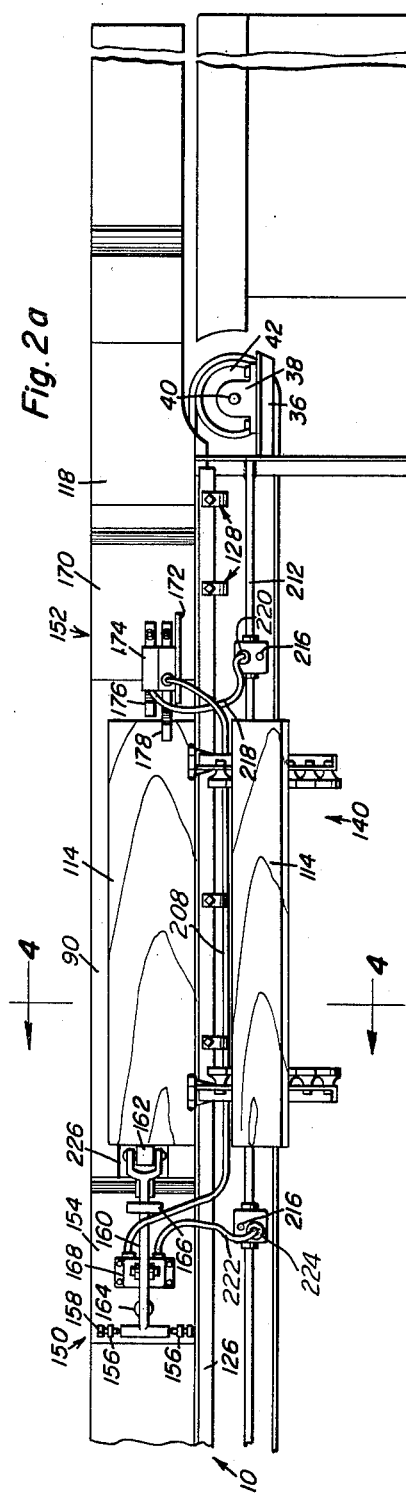
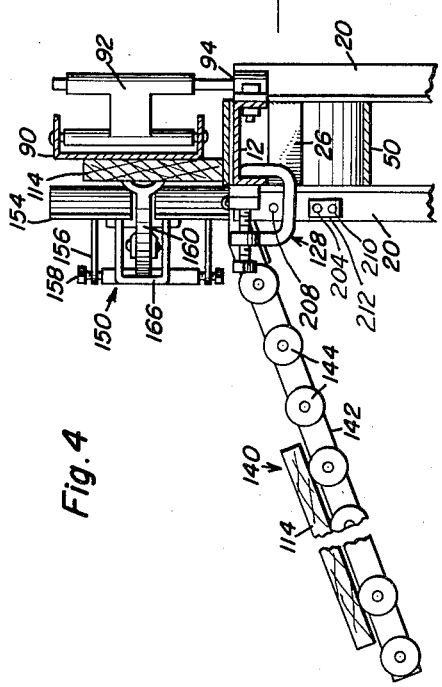
Robert H. Eckart
INVENTOR.

United States Patent Office 2,835,385
Patented May 20, 1958

2,835,385

LUMBER SORTING CONVEYOR

Robert H. Eckart, Corydon, Ind., assignor to The Keller Manufacturing Company, Corydon, Ind., a corporation of Indiana Application December 20, 1954, Serial No. 476,120

1 Claim. (Cl. 209—90)

This invention relates in general to new and useful improvements in sorting devices, and more specifically to an improved lumber sorting conveyor.

In the lumber industry, because of the differences in lengths of logs passed into a sawmill, lumber varies in length. Therefore, it is desirable at some stage in the operation, particularly after the lumber has been cut to length by cut-off saws, to sort the lumber. Also, after the lumber has been properly finished, it is necessary that the lumber pass from a jointer to ripping saws for further cutting. This lumber should preferably be sorted as to length and transported to the rip sawing stations. Inasmuch as the lumber exits from a jointer on a conveyor it is highly desirable that the same conveyor may be utilized in sorting the lumber according to its length. This is also true of the lumber passing from the cut-off saw.

It is therefore the primary object of this invention to provide an improved lumber assorting conveyor which is so constructed whereby the same conveyor which removes lumber from a jointer may also be utilized in the sorting of such lumber.

Another object of this invention is to provide an improved lumber sorting conveyor which is so constructed whereby lengths of lumber, as they pass along the lumber sorting conveyor will be removed therefrom according to their particular lengths, the places where the lumber is ejected from the conveyor not necessarily having to be graduated according to the length of lumber being ejected.

Another object of this invention is to provide an improved lumber sorting conveyor which is so constructed whereby lumber ejecting devices which will eject lumber according to its lengths may be adjustably positioned thereon so that the particular length of lumber being ejected by a particular ejecting device may be varied as desired.

Still another object of this invention is to provide an improved auxiliary conveyor for moving ejected lumber from the lumber sorting conveyor, the auxiliary conveyor being formed in two sections and being adjustably clamped to the lumber sorting conveyor whereby the effective width of the auxiliary conveyor may be varied as desired to accommodate lumber of different lengths.

A further object of this invention is to provide an improved lumber sorting conveyor which includes an adjustable back plate, the back plate being selectively adjusted so that various thicknesses of lumber may be sorted with a single lumber sorting conveyor.

A further object of this invention is to provide an improved lumber ejecting device for use in sorting lumber, the ejecting device including an ejecting arm and electrical means for controlling the operation of the ejecting arm, the electrical means including a pair of switches mounted in longitudinally spaced relation and being engageable by lumber to be sorted for automatic operation of the ejecting arm in timed sequence with the movement of lumber along an associated conveyor.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figures 1 and 1a are top plan views of the lumber sorting conveyor which is the subject of this invention and show the general details thereof, intermediate portions of the conveyor being omitted;

Figures 2 and 2a are side elevational views of the lumber sorting conveyor of Figure 1 and show further the details of the conveyor including the drive means therefor;

Figure 3 is an enlarged transverse vertical sectional view taken substantially upon the plane indicated by the section line 3—3 of Figure 1a and shows the specific details of construction of the conveyor including the manner in which lumber guide plates are removably connected thereto;

Figure 4 is an enlarged fragmentary transverse vertical sectional view taken substantially upon the plane indicated by the section line 4—4 of Figure 2a and shows the general details of construction of the sorting conveyor in the vicinity of a lumber ejecting station, the ejecting arm of the station being shown in a lumber ejecting position;

Figure 5 is an enlarged fragmentary exploded perspective view of a portion of the longitudinal frame member of the frame of the sorting conveyor and shows the relationship of a front guide plate with respect thereto, there also being illustrated the clamp for adjustably securing the front guide plate to the main frame member;

Figure 6 is a schematic plan view of an ejecting station and shows the operation thereof when a length of lumber shorter than the length intended to be ejected by that station passes thereby;

Figure 7 is a plan view similar to Figure 6 and shows the operation of the ejecting unit when a length of lumber longer than the length intended to be ejected by the ejecting unit passes thereby; and Figure 8 is a plan view of the ejecting station of Figure 6 and shows the ejecting unit thereof in operation ejecting a length of lumber corresponding to the length for which the ejecting station is set.

Referring now to the drawings in detail, it will be seen that there is illustrated best in Figures 1, 1a, 2 and 2a an endless conveyor which is referred to in general by the reference numeral 10. The endless conveyor 10 includes an elongated frame member 12 which is supported at longitudinally spaced intervals by supporting frames which include an end supporting frame 14, an intermediate supporting frame 16, and another end supporting frame 18.

As is best illustrated in Figure 3, each of the supporting frames includes a pair of spaced parallel vertical legs 20 which are connected together by a horizontally disposed, transversely extending foot 22 which extends between the lower ends of the legs 20. The upper ends of the legs 20 are directly secured to the frame member 12 by suitable fasteners 24. The upper parts of the legs 20 are also connected together immediately below the frame member 12 by a brace 26.

Extending outwardly from the end of the supporting frame 18 is a platform 28 on which is mounted a pair of transversely aligned pillow blocks 30. Extending between the pillow blocks 30 is a shaft 32 carrying an idler roller 34.

The supporting frame 14 has extending outwardly therefrom a platform 36 which is identical with the platform 28. Carried by the platform 36 is a pair of transversely aligned pillow blocks 38 having extending therebetween and supported thereby a shaft 40. Carried by the shaft 40 is an idler roller 42 which is aligned with the idler roller 34.

Carried by the brace 26 of the supporting frame 16 is a pair of transversely aligned pillow blocks 44. The pillow blocks 44 have suitably journaled therein a shaft 46 on which is mounted a drive pulley 48. The upper portion of the idler roller 48 is aligned with the lower portion of the idler roller 42 and entrained over the idler rollers 34, 42 and 48, is an endless conveyor belt 50.

In order that the conveyor belt 50 may be properly tensioned, there is secured to the legs 20 of the supporting frame 16 below the brace 26 a mounting plate 52. Adjustably carried by the mounting plate 52 for vertical movement is a slide plate 54. Secured to the slide plate 54 is a pair of transversely aligned pillow blocks 56 which have journaled therebetween a shaft 58. Carried by the shaft 58 is an idler pulley 60 which is disposed below and slightly offset from the drive pulley 48. The idler pulley 60 is vertically adjustable due to its mounting, and has entrained thereover the endless conveyor belt 50 so as to permit adjustable tensioning of the conveyor belt 50.

Extending between the legs 20 of the supporting frames 18 and 16 is a pair of longitudinal frame members 62. The frame members 62 have secured thereto a mounting plate 64 which is horizontally disposed. Overlying the mounting plate and slidably connected thereto for adjustable positioning with respect thereto is a slide plate 66. Carried by the slide plate 66 is an electric motor 68 including an armature shaft 70. Mounted on the armature shaft 70 is a drive pulley 72.

Disposed in alignment with the drive pulley 72 is a driven pulley 74. The driven pulley 74 is carried by a transverse shaft 76 suitably mounted in pillow blocks (not shown) carried by a plate 78 extending transversely between the lower portions of the legs 20 of the supporting frame 16. Entrained over the pulleys 72 and 74 is a drive belt 80 for driving the pulleys 74.

The shaft 76 has carried thereby a sprocket 82 which is aligned with a sprocket 84 carried by the shaft 46. Entrained over the sprockets 82 and 84 for driving the drive roller 48 is a drive chain 86.

As is best illustrated in Figures 1a and 2a, disposed adjacent the right hand end of the conveyor 10 is a woodworking machine, such as a jointer 88. The jointer 88 is intended to pass finished lumber therefrom onto the conveyor belt 50.

In order that lumber, preferably in the form of boards, may be retained on the conveyor belt 50 in an on-edge position, there is provided a back plate 90 for the conveyor belt 50. The back plate 90 is adjustable to accommodate various widths of boards and is carried by a plurality of arms 92 pivotally carried by brackets 94 secured to the frame member 12 at the rear edge thereof. It will be readily apparent that by swinging the arms 92, the back plate 90 may be moved forwardly or rearwardly, as desired, with the back plate 90 remaining parallel to its original position.

The adjustment of the back plate 90 is accomplished through an adjusting screw 96 pivotally secured to the back plate 90, as at 98, as is best illustrated in Figure 1. The adjusting screw 96 passes through a sleeve 100 fixedly secured to the frame member 12 and has adjustably secured thereon a nut member 102 which engages the sleeve 100. Carried by the adjusting screw 96 between the sleeve 100 and the back plate 90 is a spring 104 which continuously urges the back plate 90 away from the sleeve 100.

Referring now to Figure 1a again in particular, it will be seen that the back plate 90 is provided at the right hand end thereof with an extension 106. The extension 106 is pivotally connected to the back plate 90, as at 108, and overlies the jointer 88. Carried by the table of the jointer 88 is a pin 110 which is received in an elongated slot 112 in the extension 106. This permits the back plate 90 to swing as necessary for its adjustment, and at the same time, to retain the extension 106 in position for guiding lumber, such as the board 114, onto the conveyor belt 50. Carried by the jointer 88 in spaced relation with respect to the extension 106 is a guide roller assembly 116 which also facilitates the alignment of a board with the conveyor belt 50.

Referring now to Figure 5 in particular, it will be seen that there is illustrated the connection between a front plate 118 and the frame member 12. The frame member 12, being channel-shaped in cross-section, includes an upper horizontal web 120 and depending front and rear flanges 122 and 124, respectively. The front plate 118 is secured to the front flange 122 by an elongated clamping strip 126 which is secured in place by a plurality of longitudinally spaced clamps which are referred to in general by the reference numeral 128.

Each of the clamps 128 includes a lower web portion 130 which terminates in an upwardly directed, relatively short back flange 132. The forward edge of the web 130 terminates in a relatively long upwardly directed front flange 134. Adjustably carried by the front flange 134 is a clamping screw 136.

Referring now to Figures 1 and 1a in particular, it will be seen that disposed normal to the conveyor 10 is a plurality of auxiliary conveyors including the auxiliary conveyor 138 and the auxiliary conveyor 140. The auxiliary conveyors 138 and 140 include a pair of spaced, parallel conveyor rails 142. Carried by each of the conveyor rails 142 is a plurality of rollers 144 which are spaced longitudinally of the conveyor rails 142 and transversely of the conveyor 10. The individual conveyor rails 142 slope downwardly and away from the frame member 12 and are provided at their upper ends with brackets 146 which are clamped in place by the strip 126.

It will be readily apparent when reviewing the auxiliary conveyors 138 and 140 that the only difference in the construction of the two conveyors is that the conveyor rails 142 thereof are spaced more widely apart in the case of the conveyor 140 than in the case of the conveyor 138. Inasmuch as the conveyor rails 142 are independently adjustable, it will be seen that any desired width of auxiliary conveyor may be provided by merely shifting one of the conveyor rails 142 of an auxiliary conveyor with respect to the other.

It is the purpose of the conveyors 138 and 140 to lead off from the conveyor 10 those pieces of lumber or boards 114 which are ejected from the conveyor 10 at the desired locations. It is to be understood that the conveyors 138 and 140 are of widths to receive the particular boards 114 to be ejected at their particular station.

Each of the auxiliary conveyors forms a part of a conveyor station with the conveyor stations differing only in the dimensions thereof for receiving the various lengths of boards to be ejected thereat. In addition to each of the auxiliary conveyors, each ejecting station includes an ejecting unit which is referred to in general by the reference numeral 148. Each ejecting unit 148 includes an ejecting arm assembly which is referred to in general by the reference numeral 150, and a switch assembly which is referred to in general by the reference numeral 152.

Referring now to Figure 1a in particular, it will be seen that there is illustrated one of the ejecting arm assemblies 150. The ejecting arm assembly 150 includes a mounting plate 154. The mounting plate 154 also functions as a front plate and is clamped in position by the strip 126. Extending horizontally and forwardly from the plate 154 at the left end thereof is a pair of horizontally disposed arms 156. Pivotally mounted between the arms 156 by a vertical pivot pin 158 is an ejecting arm 160. The ejecting arm is angular in outline and is provided at its opposite end with a roller 162.

The ejecting arm 160 is normally urged forwardly away from the conveyor belt 50 by a spring 164 disposed between the mounting plate 154 and the ejecting arm 160. Forward movement of the ejecting arm 160 is limited by a U-shaped stop 166 carried by the mounting plate 154. Movement of the ejecting arm 160 to a board ejecting position, such as is best illustrated in Figure 1a, is accomplished by an electromagnetic device 168 carried by the mounting plate 154 and connected to an intermediate portion of the ejecting arm 160.

The switch assembly 152 is used to control the actuation of the ejecting arm 160. The switch assembly 152 includes a mounting plate 170 which is mounted in the same manner as the mounting plate 154. Extending outwardly from the mounting plate 170 is a platform 172 on which is mounted a switch box 174. The switch box 174 includes two separate switches which are actuated by arms 176 and 178.

Referring now to the schematic diagram of Figure 6, it will be seen that associated with the arm 176 is a switch 180 which includes a fixed contact 182 and a movable contact 184 secured to the arm 176. The arm 176 is pivotally mounted, as at 186, at the right end thereof and is provided at the left end thereof with a board engageable flange 188. The switch 180 is normally closed, and the arm 176 is retained in a switch closing position by a spring 190.

Associated with the arm 178 is a normally open switch 192. The switch 192 includes a fixed contact 194 and a movable contact 196 carried by the arm 178. The arm 178 is pivotally mounted at its right end, as at 198, and is provided at its left end with a board engageable flange 200. The arm 178 is normally retained in a switch opening position by a coil spring 202.

Referring once again to Figure 6 in particular, it will be seen that connected to the contact 182 there is one lead wire 204. A contact 184 is connected to the contact 196 by a wire 206 so as to connect the switches 180 and 192 in series. Extending between the contact 194 and the electromagnetic device 168 is a wire 208. Connected to the electromagnetic device 168 is a second lead wire 210. Thus, it is necessary that both of the switches 180 and 192 be closed before the electromagnetic device 168 is energized to move the ejecting arm 160 into an ejecting position.

Referring now to Figure 2 in particular, it will be seen that there is carried by the conveyor 10 a conduit 212, the conduit 212 extending the full length of the conveyor 10 and being secured to the various supporting frames 16, 18 and 14. The conduit 212 is provided at longitudinally spaced intervals with junction boxes 214 having outlet connections 216. Each of the switch boxes 174 is provided with a lead wire 218 which is connected to the lead wire 204 and terminates in a male plug 220 plugable into the outlet fitting 216 of an associated junction box 214. Also, each of the electromagnetic devices 168 is provided with a lead wire 222 which is connected to the lead wire 210 and terminates in a male plug 224 insertable into the outlet fitting 216 of another one of the adjacent junction boxes 214. Carried by the conduit 212 are two wires (not shown) to which the lead wires 218 and 222 are individually connected to accomplish the wiring arrangement of Figure 6 when the plugs 220 and 224 are in place, one of the wires of the conduit 212 corresponding to the wire 204 and being connected to the upper ones of the fittings 216 and the other of the wires of the conduit 212 corresponding to the wire 210 and being connected to the lower ones of the fittings 216.

From the foregoing description of the various ejecting stations 148, it will be readily apparent that the ejecting stations 148 may be spaced as desired longitudinally of the conveyor 10 and that the space therebetween may be filled with the desired lengths of front plates 118. Also, it will be readily apparent that the lengths of the ejecting stations 148 and their respective auxiliary conveyors may be varied as desired so as to receive the desired length of board 114.

Referring now to Figure 1 in particular, it will be seen that a board 114 to be ejected down the auxiliary conveyor 138 has moved out of engagement with the arm 176 of the switch assembly 152 and is still in engagement with the arm 178 thereof. Thus, the electromagnetic device 168 for the ejecting arm 160 is actuated so as to move the ejecting arm 160 and its associated roller 162 into the path of the board 114 to be ejected. It is pointed out at this time that the roller 162 passes through an aligned opening 226 in the back plate 90, as is best illustrated in Figure 2a.

The ejecting arm 160 and the roller 162 remain in the path of the board 114 to be ejected until such time as the board 114 moves out of engagement with the arm 178. At this time, the spring 164 returns the ejecting arm 160 to its original position with the result that the roller 162 engages the board 114, overturning the board 114 and forcing it off the conveyor belt 50 onto the auxiliary conveyor 138, in the manner best illustrated in Figure 8.

Referring once again to Figure 6 in particular, it will be seen that there is illustrated in conjunction with the ejecting station 148 a board 114 of a length shorter than that which is intended to be ejected at the ejecting station 148. The board 114 has been illustrated in its position immediately upon passing the arms 176 and 178. Just before it moved into the illustrated position, the ejecting arm 160 was actuated and then returned to its original position. The board 114 will now continue to move past the ejecting arm 160 down to the next ejection station where it may then be ejected if the ejecting station is set for the particular length of board.

Referring now to Figure 7 in particular, it will be seen that there is illustrated a relatively long board 114 which has just moved out of engagement with the arm 176 but remains in engagement with the arm 178. This results in the actuation of the electromagnetic device 168 to move the ejecting arm 160 towards the back plate 90. Inasmuch as the board 114 is too long for the particular ejecting station 148, the roller 162 engages the board 114 and the board 114 continues in its movement to the left until such time as it moves out of engagement with the arm 178, at which time, the ejecting arm 160 returns to its original position due to the urging of the spring 164 and the board 14 continues along the conveyor belt 50 until it reaches its proper ejecting station.

From the foregoing, it will be readily apparent that a particular ejecting station set for a particular length of board will eject only that length of board and that any boards which are either shorter or longer than the particular length of board for which the ejection station is set will continue to pass down the conveyor belt 50. Because of this particular arrangement, it is not necessary to eject the boards from the conveyor 10 in any particular sequence, and this facilitates the movements of boards from the conveyor 10.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claim.

What is claimed as new is as follows:

A lumber sorter comprising an elongated conveyor for moving lumber in the direction of its length, an auxiliary conveyor disposed normal to said elongated conveyor and terminating closely adjacent said elongated conveyor, an ejector for selectively transferring lumber from said elongated conveyor to said auxiliary conveyor, said ejector including an ejecting arm mounted for movement into alignment with a length of lumber, electrical means for positioning said ejecting arm, said electrical means being controlled by a pair of switches actuated in response to movement of lumber thereby, said longitudinal conveyor having a back plate, said back plate being adjustably mounted for accommodating lumber of different thickness, said back plate being carried by a plurality of pivotally mounted arms, adjusting means for retaining said back plate in an adjusted position.

References Cited in the file of this patent

UNITED STATES PATENTS

| | | |
|---|---|---|
| 1,706,632 | Onstad | Mar. 26, 1929 |
| 1,986,427 | Denton | Jan. 1, 1935 |
| 2,600,147 | Wilson | June 10, 1952 |
| 2,636,601 | Bovay et al. | Apr. 28, 1953 |